United States Patent [19]
Koesy

[11] 3,905,007
[45] Sept. 9, 1975

[54] EQUIPMENT FOR LOCATING AND PLOTTING THE POSITION OF UNDERWATER TOWED VEHICLES

[75] Inventor: Calvin B. Koesy, Panama City, Fla.

[73] Assignee: The United States of America as represented by the Secretary of the Navy, Washington, D.C.

[22] Filed: Mar. 27, 1962

[21] Appl. No.: 183,698

[52] U.S. Cl................................. 340/3 E; 340/3 T
[51] Int. Cl.² .......................................... G01S 9/68
[58] Field of Search ............... 343/6.5, 6.8, 11, 113, 343/114.5; 340/1, 3, 6, 16, 3 E, 26, 3 T, 29; 244/1 TD, 3; 114/235.2, 237

[56] References Cited
UNITED STATES PATENTS
2,557,900  6/1951  Wallace, Jr. et al. ............. 340/16 R
2,582,971  1/1952  Dunmore ............................ 343/11

Primary Examiner—Richard A. Farley
Attorney, Agent, or Firm—Richard S. Sciascia; Don D. Doty; Harvey A. David

EXEMPLARY CLAIM

1. In a system for indicating the relative position between a vehicle being towed submerged and a tow ship, the combination with an acoustic transponder mounted on the vehicle comprising:

first and second acoustic transducers spaced athwart on the tow ship, means for transmitting an acoustic pulse from the first transducer to trigger said transponder, means responsive to the transit time of acoustic energy from said first transducer to said transponder and return to said first transducer for providing a first voltage proportional to the slant range to said vehicle, means responsive to said slant range voltage and to the depth of said vehicle for providing a second voltage proportional to the horizontal range to said vehicle, means responsive to the transit time of acoustic energy from said first transducer to said second transducer via said transponder for providing a third voltage proportional thereto, means establishing a fourth voltage proportional to the travel time of an acoustic pulse between said first and second transducers, and computer means connected to said first, third and fourth voltages for providing an output voltage proportional to the relative bearing of said vehicle.

5 Claims, 4 Drawing Figures

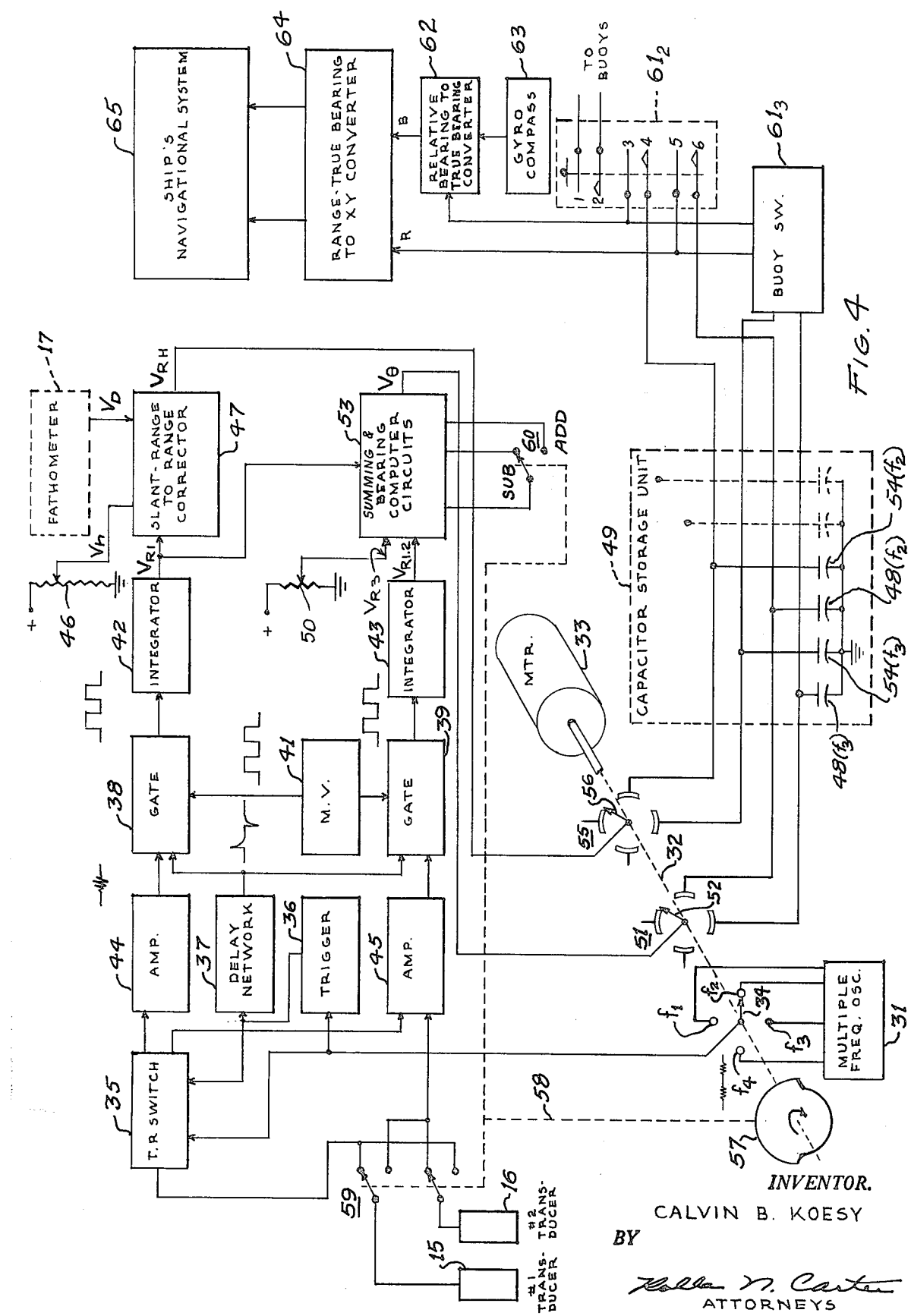

EQUIPMENT FOR LOCATING AND PLOTTING THE POSITION OF UNDERWATER TOWED VEHICLES

The invention described herein may be manufactured and used by or for the Government of the United States of America for governmental purposes without the payment of any royalties thereon or therefor.

The present invention relates to position determining equipment for towed vehicles and more particularly a system for determining the relative position between an underwater vehicle being towed submerged and the tow ship. More specifically, the invention is directed to determining and separately storing, at frequent intervals, range and bearing information of one or more towed vehicles with respect to the towing vessel to the end that such information is available on a substantially current basis for plotting at any desired time the then geographic position of a selected towed vehicle.

Certain minehunting systems utilize an array of vehicles towed close to the ocean floor and individually equipped with short range mine locators and reference markers or buoys which later can be dispensed at will by an operator on the tow ship. Minehunting vessels are equipped with a precise system of navigation and in accordance with the invention at the time a marker is dispensed the navigation system is presented with information referenced to the position of the towed vehicle.

An object of the invention is the provision of a system which will determine in rapid succession the position of a towed vehicle relative to the towing vehicle.

Another object of the invention is the provision in such a system of a memory device for storing vehicle position information from which such information will be "printed out" at the will of an operator, e.g., when a reference marker is released from the towed vehicle.

In accordance with a preferred embodiment of the invention, a towed vehicle is provided with a transponder which transmits an answering ping at a first frequency when interrogated by an acoustic pulse of a second frequency transmitted by one of two transducers mounted in spaced athwart relation on the towing vessel. The differences in the elapsed time for sound to travel from the transmitting shipboard transducer to the vehicle transponder and back to the two shipboard transducers is utilized to determine the range and bearing of the vehicle carrying the answering transponder, the fixed distance between the two shipboard transducers being known. This range and bearing information in the form of electric voltages is stored by charging a pair of capacitors to potentials proportional, respectively, to the range and bearing of said particular vehicle. Also, in accordance with the invention, at the will of an operator the stored potentials may be introduced into the ship's navigation system to plot or otherwise indicate the range and bearing of the vehicle with respect to the ship's position. When more than one vehicle is being towed, their transponders are made to be individually responsive to signals of unique frequency and the shipboard transmitting transducer is energized to transmit successively the several frequencies to which the transponders are receptive.

Other objects and advantages of the invention, as well as its mode of operation, will be apparent to those skilled in the art from the following description when read in connection with the accompanying drawings in which:

FIG. 4 is a schematic diagram of the shipboard portion of a system embodying the invention.

Figure 1:
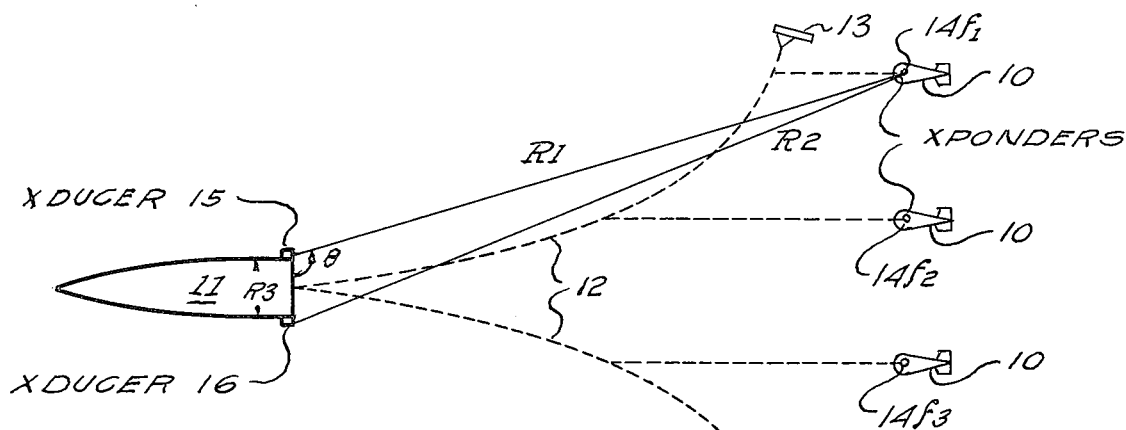
FIGS. 1 and 2 show schematically in plan and elevation views, respectively, the geometry of a system for determining the positions of towed vehicles.
Figure 3:
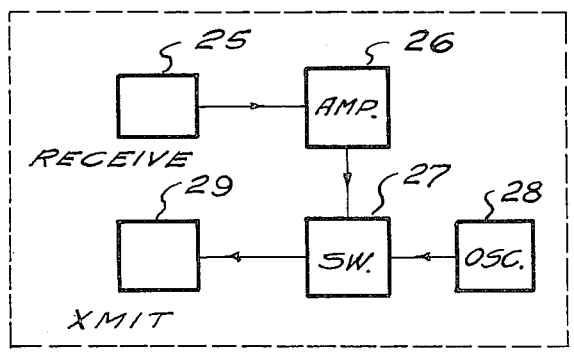
FIG. 3 is a block diagram of a transponder which may be used on the towed vehicles.

The relationship of the equipment components as well as the geometry of the position measuring system will be understood by referring to FIGS. 1 and 3, wherein a plurality of vehicles 10 are shown in an array under tow by a surface vessel 11 through a well-known arrangement of tow and conductor cables 12, shown in broken lines, and held spaced apart by paravanes 13. Each of the towed vehicles 10 carries a transponder 14 selectively responsive to a unique signal frequency. As here indicated, the four transponders 14 are responsive to signal frequencies $f_1, f_2, f_3$ and $f_4$, respectively. First and second tranducers 15 and 16, respectively, carried submerged by and spaced athwart the towing vessel 11, in cooperation with their associated equipment to be described in connection with FIG. 4, function to determine the distances $R_1$ and $R_2$ and the angle $\theta$. Assuming that the transducer 15 is energized to transmit an interrogating pulse, the range $R_1$ the distance from the initiating transducer 15 to the vehicle 10 is $$R_1 = V_p \frac{(t_1 - t_2)}{2} \quad (1)$$

where $V_p$ = the velocity of propagation in sea water
$t_1$ = the elapsed time of the pulse from the transducer 15 to the vehicle and return to the transducer 15
$t_2$ = the delay time in the transponder 14

The range $R_2$, the distance from the vehicle to the transducer 16 is $$R_2 = V_p (t_3 - t_2) - R_1 \quad (2)$$

where $t_3$ = The elapsed time of the pulse from the transducer 15 to the transducer 16 via the vehicle.

The ranges $R_1$ and $R_2$ are combined with the distance $R_3$ between the two transducers 15 and 16 in a bearing computer to obtain the bearing angle $\theta$ of the vehicle 10 with respect to the line joining the transducers 15 and 16, i.e., the ship's transom, as indicated in FIG. 1. It will be evident that with respect to the ship's heading the bearing of the line segment from the transducer 15 to the transducer 16 is 270° and the bearing of the line segment from the transducer 16 to the transducer 15 is 90°. This bearing computer may be of a conventional analogue type for solving the equation $$\cos \theta = \frac{R_1^2 + R_3^2 - R_2^2}{2R_1R_3} \quad (3)$$

and having a summing network for solving equation (2).

Figure 2:
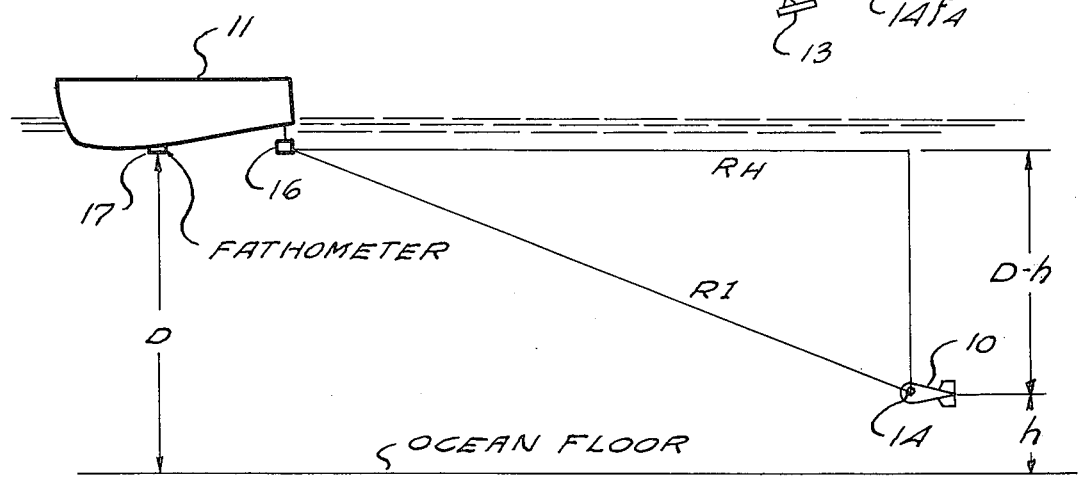

It will be evident from FIG. 2 that the range $R_1$ is a slant range and that for plotting purposes it is the horizontal range $R_H$ which is of interest. As will be later described, the ship's fathometer 17 provides the depth of the seaway, which depth D minus the fixed height h the vehicle 10 rides above the ocean floor gives the dimension of one side of a right triangle having a hypotenuse equal to $R_1$ and values equal to these two dimensions can be furnished to a resolver for correcting slant range $R_1$ to horizontal range $R_H$.

One suitable circuit for the transponders 14 is shown in FIG. 3 as comprising a receiver transducer 25 having its output signal connected to a frequency selective amplifier 26, the output of which controls a switch 27 for connecting an oscillator 28 to a transmitting transducer 29 to emit an acoustic pulse of the same length as the interrogating pulse received by the transducer 25. The amplifiers 26 in the several transponders 14 are made selective to a frequency of $f_1, f_2, f_3,$ or $f_4$, as required.

The shipboard equipment diagramatically shown in FIG. 4 for performing the above described functions includes a multiple frequency oscillator 31 having four output terminals labeled $f_1, f_2, f_3, f_4$, respectively, on which are available corresponding frequencies. A shaft 32, driven by a motor 33, carries a contact 34 which rotates with the shaft 32 for connecting in succession the output terminals of the oscillator 31 through a TR switch 35 to the transducer 15, here designated No. 1. The contact 34 also connects the oscillator 31 to a trigger circuit 36, the output of which actuates the TR switch 35 and through a delay network 37 opens gates 38 and connect a to connecta square wave generator such as a multivibrator 41 to integrating circuits 42 and 43, respectively. While TR switch 35 is transmitting it momentarily blocks amplifiers 44 and 45 connected, respectively, in the receiving circuits of the transducers 15 and 16. Acoustic pulses received by the transducers 15 and 16 are amplified by the amplifiers 44 and 45 and utilized to close the gates 38 and 39, thereby stopping the integrators 42 and 43. The network 37 is provided with a delay equal to the delay time $t_2$ in the involved transponder 14, such delay time being typically less than 1 millisecond. The output voltage from the integrator 42 is proportional to twice the travel time of an acoustic pulse from the transducer 15 to the pertinent transponder 14 and thus this voltage $V_{R1}$ is proportional to the slant range $R_1$ in FIGS. 1 and 2. The output voltage $V_{R1.2}$ of the integrator 43 is proportional to the travel time of an acoustic pulse from the transducer 15 to the transponder 14 and back to the transducer 16 and, therefore, is proportional to the distance $R_1$ plus $R_2$. Hence, the voltage $V_{R1.2}$ minus the voltage $V_{R1}$ provides a voltage $V_{R2}$ proportional to the distance $R_2$ as indicated by equation (2). The output voltage $VR_1$ from the integrator 42, a constant voltage $V_h$ tapped from a potentiometer 46 and preset to a value corresponding to the height h the vehicle 10 rides above the ocean floor, and a voltage $V_D$ from the ship's fathometer 17 and combined in a resolver 47 (slant range to range corrector) to provide a voltage $V_{RH}$ proportional to horizontal range $R_H$. This horizontal range voltage $V_{RH}$ is stored in the appropriate range capacitor 54 in a storage unit 49 via a selector switch 55, the rotating contact 56 of which is also mounted on the shaft 32 of the motor 33. The output voltage $V_{R1.2}$ is summed with the voltage $V_{R1}$ in a summing network in a computer 53 to provide the voltage $V_{R2}$ which is then combined in a bearing computer circuit in the computer 53 with the slant range voltage $V_{R1}$ and a voltage $V_{R3}$ preset on a potentiometer 50 to be proportional to the travel time of an acoustic pulse between the transducers 15 and 16 and, hence, proportional to the distance $R_3$. The computer 53 solves equations (2) and (3) to provide an output voltage $V_\theta$ proportional to the bearing of the vehicle carrying the pertinent transponder 14. This output voltage $V_\theta$ is fed into the appropriate capacitor 48 in the storage unit 49 via a selector switch 51, the rotating contact 52 of which is also mounted on the shaft 32 of the motor 33. It will be noted that the rotating contacts 52 and 56 of the switches 51 and 55, respectively, are displaced angularly behind the rotating contact 34 to allow for the time between the transmission of a pulse and the receipt of a pulse from a transponder 14. It will also be noted that the stationary contacts of the switches 51 and 55 are elongated so as to accommodate different travel times for the differences in the ranges of the several vehicles 10.

The normal symmetry of the towed array, evident from FIG. 1, makes it possible to simplify the computer 53 by utilizing the No. 1 transducer 15 for interrogating the transponders in the vehicles 10 to starboard and to interrogate with the No. 2 transducer 16 for the transponders in the vehicles 10 to port for the reason that the position directly astern of the towing vessel 11 has a relative bearing of 180°; thus the relative bearing of the starboard vehicles 10 is less than 180°, while the relative bearing of the port vehicles 10 is greater than 180°. Equation (3) allows determination of the obtuse angle $\theta$ which $R_1$ makes with the line joining the transducers 15 and 16. To relate this angle to ship's heading, the angle $\theta$ must be substracted from 270°. When the positions of port side vehicles are to be determined utilizing the No. 2 transducer to transmit the interrogating pulses, a similar obtuse angle must be determined and added to 90° in order to relate vehicle bearing to ship's heading. The desired subtraction and addition may conveniently be accomplished by correspondingly altering the output of the computer, as by means of a switch 60, in time relation with the selection of a transducer 15 or 16 to do the interrogating and thus permit the use of the same computer circuits to solve the symmetrical angles involved when the relative bearings to the starboard and port side vehicles are being determined. Such operation is obtained by mounting on the motor shaft 32 a cam 57 provided with a cam follower 58 which moves switches 59 and 60 to the positions shown in FIG. 4 during the period the starboard transponders 14 ($f_1$) and 14 ($f_2$) are interrogated and into their alternate position during the interrogation of the transponders 14 ($f_3$) and 14 ($f_4$), i.e., the No. 2 transducer 16 transmits the interrogating pulses and the switch 60 is in the add position to bring the value of $V_\theta$ to the correct relative bearing. With the range and bearing of each vehicle stored on the capacitors in the storage unit 49, when it is desired to plot or indicate the instantaneous position of any one vehicle 10, say the one with the transponder 14 ($f_2$), as when a buoy is to be dropped, the corresponding buoy switch $61_2$ may be actuated by an operator to close its three pairs of contacts. Contacts 1 and 2 close the buoy release circuit. Contacts 3 and 4 connect the relative bearing capacitor 48 ($f_2$) to a relative bearing to true bearing convertor 62 controlled by a gyro compass 63 to provide an output B proportional to true bearing, which output B in the form of a voltage or other physical characteristic is applied to a convertor 64, and contacts 5 and 6 connect the range storage capacitor 54 ($f_2$) to the convertor 64 which converts these voltages into voltages proportional to the rectangular coordinates of the true range and bearing of the position of the vehicle and these voltages are in turn introduced into the ship's navigational system 65 to plot or otherwise indicate the geographical position of the vehicle at the moment.

In operation of the system of the invention, the vehicles may be towed at a distance of approximately 200 yards at a speed of 6 knots and the selector switches driven by the motor 33 at one revolution per second to provide for an accuracy of range and bearing within 10 feet. It will be evident that when only one vehicle is being towed its relative position may be determined without ambiguity by utilizing an echo returned from the vehicle without the need for a vehicle mounted transponder. Also, it will be evident that in shallow water or other uses when the vehicles are relatively close to the surface the slant range to range corrector may be dispensed with without introducing substantial error.

While for the purpose of disclosing the invention a preferred embodiment thereof has been described in detail many modifications will suggest themselves to those skilled in the art and all such modifications are intended to be included within the scope of the appended claims.

What is claimed is:

1. In a system for indicating the relative position between a vehicle being towed submerged and a tow ship, the combination with an acoustic transponder mounted on the vehicle comprising:

first and second acoustic transducers spaced athwart on the tow ship, means for transmitting an acoustic pulse from the first transducer to trigger said transponder, means responsive to the transit time of acoustic energy from said first transducer to said transponder and return to said first transducer for providing a first voltage proportional to the slant range to said vehicle, means responsive to said slant range voltage and to the depth of said vehicle for providing a second voltage proportional to the horizontal range to said vehicle, means responsive to the transit time of acoustic energy from said first transducer to said second transducer via said transponder for providing a third voltage proportional thereto, means establishing a fourth voltage proportional to the travel time of an acoustic pulse between said first and second transducers, and computer means connected to said first, third and fourth voltages for providing an output voltage proportional to the relative bearing of said vehicle.

2. The combination according to claim 1, and means for converting said output voltage and said second voltage into an indication of the relative position between towed vehicle and the towed ship.

3. In a system for indicating the relative position between a vehicle being towed and a tow ship, the combination with a navigation system carried by the two ship comprising:

first and second stations spaced athwart on the tow ship, means for providing a first voltage proportional to the range from said first station to the towed vehicle, means for providing a second voltage proportional to the sum of the ranges from said first station to said vehicle and from said second station to said vehicle, means for providing a third voltage proportional to the distance between said first and second stations, computer means connected to said first, second and third voltages for providing an output voltage proportional to the relative bearing of said vehicle, means responsive to said first voltage and to the depth of said vehicle for providing a fourth voltage proportional to the horizontal range to said vehicle, a gyro compass, means controlled by said compass for converting said output voltage to a physical characteristic proportional to the true bearing of said vehicle, and means for introducing said fourth voltage and said physical characteristic as modifying factors into the ship's navigation system.

4. In an apparatus for indicating the positions relative to a ship of a plurality of vehicles towed submerged by said ship and individually equipped with a sonic transponder, each of said transponders including means for generating a sonic signal at a common frequency and receiver means individually responsive to a received interrogating sonic pulse of a unique frequency for triggering its associated signal generating means, first and second transducers spaced athwartwise said ship, means for pulse exciting the first transducer with the several unique interrogating frequencies in succession, and position indicating apparatus including receiver means responsive to the time intervals between each interrogating pulse and the arrival times at the first and second transducers of a sonic signal from the interrogated transponder for producing electrical quantities representative of the interrogated transponder's distances from said first and said second transducers, respectively, and computer means coupled to the distance representing electrical quantities for deriving respectively signals proportional to the $x$ and $y$ rectangular coordinates of the interrogated transponders's position relative to the tow ship.

5. Apparatus for determining the positions of a plurality of vehicles being towed submerged relative to a tow ship, the combination with a navigation system carried by the tow ship comprising:

means for cyclically producing a first voltage proportional to the horizontal distance and a second voltage proportional to the relative bearing of each of said vehicles in succession, a pair of electric capacitors for each vehicle under tow, means operable in timed relation with said cyclical means for separately storing said first and second voltages in a pair of capacitors individual to each of each vehicles, and manually operable switching means for connecting at will any pair of capacitors to the ship's navigation system.

* * * * *